March 15, 1927. 1,620,788
J. M. THOMPSON ET AL
DEVICE FOR PASSING CABLES THROUGH PIPE LINES
Filed Dec. 10, 1925
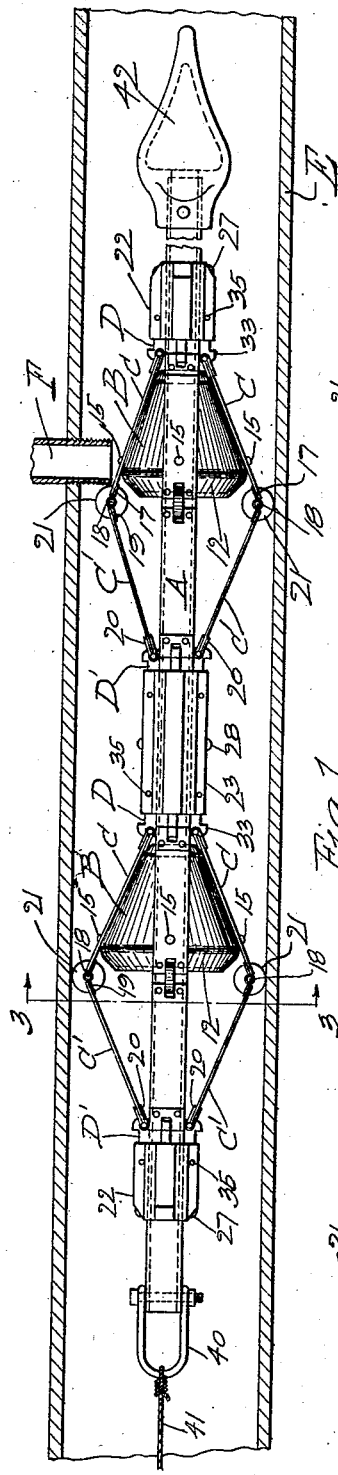
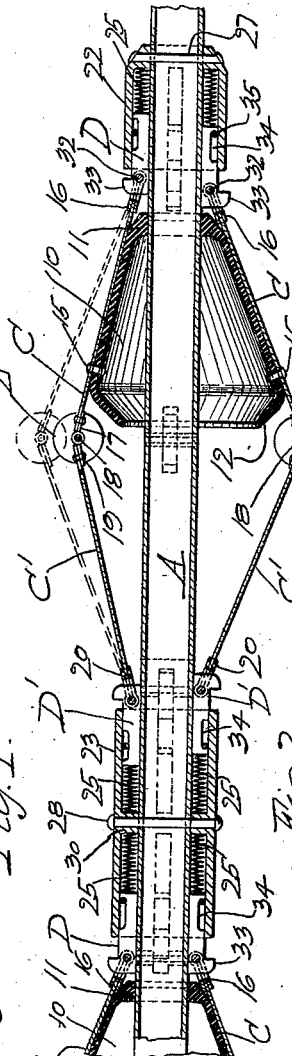
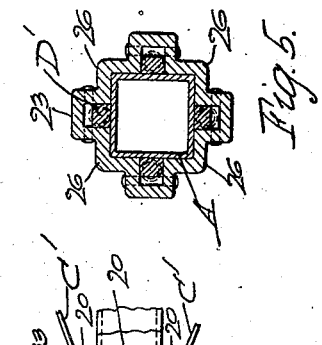
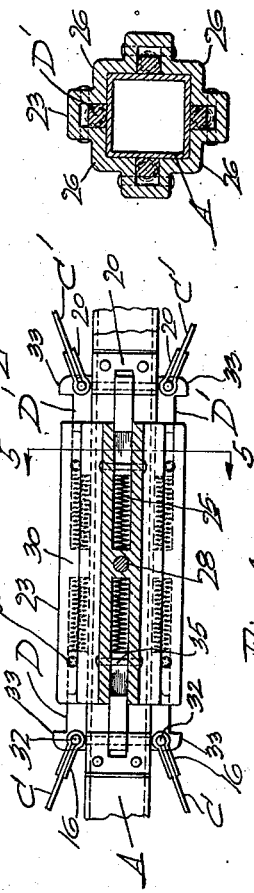
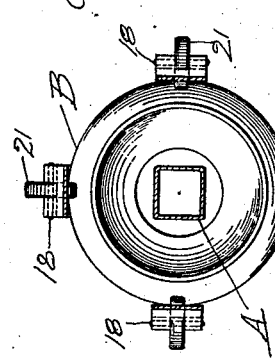
INVENTORS
John M. Thompson
William H. Thompson
By Parker & Prochnow
ATTORNEYS Patented Mar. 15, 1927.

1,620,788

UNITED STATES PATENT OFFICE.

JOHN M. THOMPSON AND WILLIAM H. THOMPSON, OF BUFFALO, NEW YORK.

DEVICE FOR PASSING CABLES THROUGH PIPE LINES.

Application filed December 10, 1925. Serial No. 74,429.

This invention relates to devices for carrying cords or cables through pipe lines, such for example as water mains, sewer pipes or the like.

Devices of this kind are generally made so that they are propelled through a pipe by a current of water or other liquid in the pipe, and a light cord or hand line is attached to the carrier. After this cord has been passed through a pipe by the carrier, a stronger cord or cable is attached to the lighter cord and drawn through the pipe, whereupon a pipe cleaning device may be drawn through the pipe line by the stronger cord or cable. In cord carriers of this kind as heretofore made, the carrier was so constructed that if for any reason it should become stuck or lodged in a pipe, it could not be withdrawn rearwardly, since the cups of the carrier with which the liquid in the pipe cooperates to force the carrier through the pipe, are so shaped that they will catch on obstructions in the pipe if an attempt is made to draw them rearwardly, so that in some cases an actual excavation and breaking of the pipe is necessary in order to remove the carrier therefrom.

The objects of this invention are to provide a cable carrier which is so constructed that it may be pulled backwardly out of a pipe in case the cable carrier becomes stuck in a pipe; also to provide a carrier of this kind which is provided with a cup which is readily collapsible in case obstructions are met and which is held in its extended position by resilient means; also to provide a carrier of this kind with yieldingly extended members which cooperate with the walls of the pipe to guide the carrier through a pipe and which are adapted to yield if obstructions are encountered; also to arrange the resiliently extended members so as to support the cup in its operative position, and to cause the cup to collapse when obstructions are encountered, whereby cups of lighter material can be provided than has heretofore been possible; also to provide cups for carriers of this kind which are formed so as to enable edges of the cups to be deflected inwardly or yield when the carrier is pulled rearwardly out of a pipe; also to improve the construction of cable carriers of this kind in such a manner that the carrier can be made largely of metal so that the same will be much more durable than other devices for similar purposes heretofore made; also to improve the construction of cable carriers of this kind in other respects hereinafter specified.

In the accompanying drawings,

Fig. 1 is a side view of a cable carrier embodying our invention and showing the same arranged in a pipe.

Fig. 2 is a fragmentary, longitudinal, sectional elevation thereof on an enlarged scale.

Fig. 3 is a transverse, sectional elevation thereof on line 3—3, Fig. 1.

Fig. 4 is a fragmentary, side elevation thereof, partly in section, showing the spring housing of the device.

Fig. 5 is a transverse section thereof on line 5—5, Fig. 4, on a slightly larger scale.

The cord or cable carrier includes a central rod or frame member A, which may be of any suitable or desired construction but is preferably made of a hollow tube which is polygonal in cross section, that shown being of square cross section. By making this central member of tubular form, it can be made very light and yet of ample strength and rigidity.

Cups or cup-shaped propelling members B mounted on the rod A may be made of any suitable material, such for example as light canvas and should preferably be comparatively thin and flexible. These cups each include a cone shaped portion 10 terminating at its reduced end in a hub portion 11 which preferably fits closely around the tubular member or rod A, and the larger end of the cone-shaped portion 10 of the cup has an inwardly flaring or short frusto conical portion 12 which serves the purpose of preventing the edges of the cup from catching on any obstructions in the pipe if it should become necessary to withdraw the carrier rearwardly out of the pipe. These inwardly flaring portions 12, in case obstructions are encountered will cause the portion of the cup contacting with the obstruction to be deflected inwardly by the obstruction, and thus enable the cup to pass beyond the obstruction.

Two cups B are shown in the particular carrier illustrated, but it will be understood that one cup only, or more than two cups may be employed on one carrier, if desired.

Each cup is arranged between a plurality of inclined outwardly extending arms C yieldingly connected with the rod A and extending outwardly beyond the portion of the cup of greatest diameter and these arms will be deflected inwardly by obstructions or bends in the pipe line and will bend inwardly the portions of the cups with which they contact, and thereby prevent the cups from becoming caught on obstructions in the pipe, and means are also provided for deflecting these arms inwardly when the carrier is withdrawn from a pipe rearwardly. These means, in the particular construction shown are in the form of arms C' pivotally connected at their outer ends to the outer ends of the arms C and also yieldingly connected at their inner ends with the rod A.

The arms C may be of any suitable or desired construction those shown being made of strips of metal which may be secured to the cups in any suitable or desired manner, rivets 15 being shown in the construction illustrated which are preferably arranged near the outer or enlarged portions of the cup. The ends of the arms are provided with bearing sleeves or straps 16 and 17, suitably secured thereto, the outer bearing sleeve 17 being pivotally connected with a pivot or hinge pin 18, to which a corresponding bearing portion 19 of the arm C' is also hinged. This arm C' is preferably similar in construction to the arm C and is provided at its inner end with a bearing strap or member 20. The bearing pin or pivot 18 also forms a bearing for a roller or disk 21, which greatly facilitates the passage of the carrier through a pipe line and the inward deflection of the arms C, C' when obstructions are encountered.

The inner ends of the arms C, C' may be slidably and yieldingly connected with the rod A in any suitable or desired manner, in such a way that the arms will normally be held in their outer positions. In the particular construction shown for this purpose, the bearing straps or members 16 and 20 of the arms C, C' are pivotally connected to slide members D, D' respectively. Each of these slide members is preferably guided to move lengthwise of the rod A by means of spring housings 22 and 23. The spring housings 22 and 23 may be of any suitable or desired construction, those shown being substantially channel or U-shaped in cross section and arranged with their open sides against the sides of the rod A, thus forming closed channels in which the slides may operate and in the ends of which springs 25 are arranged which tend to push the slides out of the housings. The housings for the several springs and slide members may be formed separate and each attached to the central rod independently of the other housings, or if desired a plurality of housings may be connected or formed as a unit extending around the central rod or tubular member A, the unit including connecting or corner pieces or portions 26 secured to or formed integral with the housings 22 or 23, so that the unit as a whole may be slid over the central tubular rod A and suitably secured thereto. The front and rear housings 22 as shown in Figs. 1 and 2 are secured in place by means of a rivet or pin 27 extending through the housings and through the central tubular member A. The middle or intermediate spring housings 23 are arranged in a double unit, two housings being arranged end on end and facing or opening in opposite directions and this unit is secured to the central tubular member A by means of a rivet or bolt 28 extending through the central portion of the unit and the central tubular member A. The housings 23 facing in one direction are adapted to accommodate slides D, and those facing in the opposite directions receive the slides D', and the springs 25 acting on these slides bear against an inner partition wall 30 which separates the oppositely facing housings 23.

The slide members D, D' are preferably alike in construction, each being of a form to fit snugly into its housing member and being provided on its outer portion with a pivot 32 with which the bearing straps of the arms C, C' are connected, and an outwardly extending stop portion or shoulder 33 which limits the extent to which the slide member may be moved into its housing. The movement of the slide members into and out of the housings is preferably controlled by means of slots or recesses 34 formed in the outer portions of the slide members, and pins 35 extend through the recesses 34 and are secured at their ends in the housings. When the springs 25 move the slide members D, D' to their outer positions the pins 35 will engage with the inner ends of the slots or recesses 34 in the slide members, and when the slide members are pushed into their inner position against the action of the springs, the pins 35 will engage in the other ends of their recesses, and together with the shoulders 33 prevent further inward movement of the slide members.

At the rear end of the central rod or tube A, a suitable shackle 40 or other fastening means is provided to which a cord or cable 41 may be secured, and at the front end of the rod or tubular member A a spear shaped or tapered guide member or head 42 is preferably secured, which serves to guide the device around curves in the pipe and tends to keep the device from entering into elbows or branches of the main pipe line. E, Fig. 1, represents the portion of the pipe through which the cord or cable is to be passed, and F represents a branch pipe extending into the main pipe E.

In operation, the device is inserted into a pipe with the head 42 extending in the direction in which the carrier is intended to pass through the pipe, and the cup or cups B open toward the rear of the carrier. A cord or cable is then secured to the shackle 40 at the end of the carrier. The cups B are normally held open by means of the springs 25 and the slides D, D' which act on the arms C, C' to hold the same in the position shown at the left of Fig. 1, in which position the rollers 21 will engage with the inner surface of the pipe. This action of the spring not only guides the device in the pipe and holds the same in correct position therein, but also tends to dilate or open the cups B. Consequently when the current of liquid is flowing through the pipe this liquid cooperating with the cups B will force the device forwardly through the pipe. In case an obstruction is encountered such as the branch pipe F shown in Fig. 1, if this obstruction is struck by an arm C, this arm will be deflected as shown in Figs. 1 and 2 and the roller 21 will freely pass over the obstruction, the arms C, C' moving from the position shown in dotted lines in the upper part of Fig. 2 into the full line position, during which movement the slides D, D' connected with the arms C, C' will move into their spring housings against the action of the springs 25. As soon as the obstruction is passed the spring 25 will again move the arms C, C' into the dotted line position shown in Fig. 2. Because of the flexible mounting of the arms C, C' the device is not apt to become stuck in a pipe because of obstructions therein. On the other hand, if for any reason the device does become stuck in a pipe and must be withdrawn, comparatively slight pull on the cord or cable 41 will suffice to withdraw the device and in case obstructions are met when the device is withdrawn, the arms C' will readily yield in the same manner as described with reference to the arms C. It will be obvious that these arms can be moved inwardly until they are almost parallel with and lie in close proximity to the central tube A, so that even great obstructions in the pipe will not prevent the passage of the carrier therethrough. In case a cup strikes an inwardly extending projection or obstruction in the pipe when the device is being moved rearwardly out of the pipe, such an obstruction will engage a portion of the inwardly flaring edge 12 of the cup, which will cause such portion of the cup to be deflected inwardly and thus pass over the obstruction without damage to the cup. Even if a cup should become caught on a projection in a pipe, the fact that the cup is made of light material will make it possible to tear or break the cup before the cord 41 will break, so that the device will not become lodged in a pipe. The cup can be readily replaced by removing the rivet 15 and placing another cup on the carrier. On the other hand the lightness of the cup does not in any way interfere with the operation of the device since the cups are held in their outer or operative position by the springs 25 and not by their own stiffness or rigidity.

We claim as our invention:

1. In a device for passing cables through pipe lines, the combination of a rod, a cup-shaped propelling member of flexible material arranged on said rod, and a plurality of pairs of arms, each of said arms of a pair being yieldingly connected at one end to said rod and the other ends of said arms being pivotally connected together, the arms of each pair extending outwardly from said rod in opposite directions, one arm of each pair being adjacent to said cup-shaped member, whereby said arms will be deflected inwardly toward said rod when meeting obstructions in the pipe line while said device is moving in either direction, the inward deflection of an arm by an obstruction causing said cup-shaped member to be deflected away from said obstruction.

2. In a device for passing cables through pipe lines, the combination of a rod, a cup-shaped propelling member of flexible material arranged on said rod, a plurality of pairs of arms pivotally connected together and extending in opposite directions from their pivots toward said rod and being yieldingly connected to said rod and arranged exteriorly to said cup-shaped member, and means for yieldingly holding said pivoted portions of said arms outwardly, whereby said arms may be moved inwardly by obstructions in said pipe when said device is passing through said pipe in either direction.

3. In a device for passing cables through pipe lines, the combination of a rod, a plurality of pairs of arms arranged at intervals about said rod, the two arms of each pair being pivotally connected together at one of their ends and having their other ends spaced apart and slidably connected with said rod, means for normally urging the pivoted portions of said arms outwardly with reference to said rod, and a cup-shaped propelling member of flexible material arranged between said arms.

4. In a device for passing cables through pipe lines, the combination of a rod, a plurality of pairs of arms arranged at intervals about said rod, the arms of each pair being pivotally connected to each other at one end and having their other ends spaced apart and slidably mounted on said rod, springs acting on said slidably mounted end in a direction to urge the pivotally connected ends of said arms outwardly from said rod, and a cup-shaped propelling member of flexible material arranged between said arms.

5. In a device for passing cables through pipe lines, the combination of a rod, a plurality of pairs of arms arranged at intervals about said rod, the arms of each pair being pivotally connected to each other at one end and having their other ends spaced apart and slidably mounted on said rod, springs acting on said slidably mounted end in a direction to urge the pivotally connected ends of said arms outwardly from said rod, housings for said springs secured to said rod and guiding said arms in their sliding movement, and a cup-shaped propelling member of flexible material connected to one arm of each pair and held in its extended position by said arms and adapted to be deflected toward said rod when said arms are moved inwardly by an obstruction in the pipe line.

6. In a device for passing cables through pipe lines, the combination of a rod, a plurality of pairs of arms arranged at intervals about said rod, one end of each arm of a pair being pivotally connected to the adjacent end of the other arm, and the other ends of said arms being spaced apart, slide members adapted to slide lengthwise of said rod and to which said spaced apart ends of said arms are pivotally connected, springs acting on said slides and tending to move said arms in a direction to move their pivotally connected ends outwardly with reference to said rod, and a cup-shaped propelling member of flexible material arranged between said arms.

7. In a device for passing cables through pipe lines, the combination of a rod, a plurality of pairs of arms arranged at intervals about said rod, one end of each arm of a pair being pivotally connected to the adjacent end of the other arm, and the other ends of said arms being spaced apart, slide members adapted to slide lengthwise of said rod and to which said spaced apart ends of said arms are pivotally connected, springs acting on said slides and tending to move said arms in a direction to move their pivotally connected ends outwardly with reference to said rod, housings for said springs and said slide members and mounted on said rod, and a cup-shaped propelling member of flexible material arranged between said arms.

8. In a device for passing cables through pipe lines, the combination of a rod, a plurality of pairs of arms arranged at intervals about said rod, one end of each arm of a pair being pivotally connected to the adjacent end of the other arm, and the other ends of said arms being spaced apart and slidably arranged relatively to said rod, springs acting on the slidably arranged ends of said arms and tending to move the pivotally connected ends thereof outwardly with reference to said rod, and a housing member adapted to be secured to said rod and having housings arranged at intervals about said rod in which the springs are contained.

9. In a device for passing cables through pipe lines, the combination of a rod, a plurality of pairs of arms arranged at intervals about said rod, one end of each arm of a pair being pivotally connected to the adjacent end of the other arm, and the other ends of said arms being spaced apart, slide members adapted to slide lengthwise of said rod and to which said spaced apart ends of said arms are pivotally connected, springs acting on said slides and tending to move said arms in a direction to move their pivotally connected ends outwardly with reference to said rod, housings for said springs and said slide members and mounted on said rod, and means on said housings for limiting the sliding movement of said slide members relatively to said rod, and a cup-shaped propelling member of flexible material arranged between said arms.

10. In a device for passing cables through pipe lines, the combination of a rod, a plurality of pairs of arms arranged at intervals about said rod, the two arms of each pair being pivotally connected together at one of their ends and having their other ends spaced apart and slidably connected with said rod, means for normally urging the pivoted portions of said arms outwardly with reference to said rod, rollers journalled on the pivotally connected ends of each pair of arms and adapted to roll freely in contact with the pipe to reduce the resistance of the movement of said device through a pipe, and a cup-shaped propelling member of flexible material arranged between said arms.

JOHN M. THOMPSON.
WILLIAM H. THOMPSON.